US012579063B2

(12) United States Patent
Goel et al.

(10) Patent No.: US 12,579,063 B2
(45) Date of Patent: Mar. 17, 2026

(54) EFFICIENT MACHINE LEARNING CACHING VIA ATTENTION OUTPUT-BASED TOKEN EVICTION

(71) Applicant: QUALCOMM Incorporated, San Diego, CA (US)

(72) Inventors: Raghavv Goel, San Diego, CA (US); Mukul Gagrani, Milpitas, CA (US); Junyoung Park, Palo Alto, CA (US); Dalton James Jones, Cupertino, CA (US); Mingu Lee, San Diego, CA (US); Wonseok Jeon, San Diego, CA (US); Matthew James Morse, New York, NY (US); Matthew Harper Langston, Beacon, NY (US); Christopher Lott, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/825,897

(22) Filed: Sep. 5, 2024

(65) Prior Publication Data
US 2026/0017192 A1 Jan. 15, 2026

Related U.S. Application Data

(60) Provisional application No. 63/668,874, filed on Jul. 9, 2024.

(51) Int. Cl.
*G06F 12/02* (2006.01)
*G06N 3/0475* (2023.01)

(52) U.S. Cl.
CPC ....... *G06F 12/0253* (2013.01); *G06N 3/0475* (2023.01)

(58) Field of Classification Search
None
See application file for complete search history.

(56) References Cited

U.S. PATENT DOCUMENTS

2019/0229897 A1 * 7/2019 Verrall .................. H04L 9/0894
2020/0160182 A1 * 5/2020 Matveev ................. G06N 3/08
(Continued)

OTHER PUBLICATIONS

Liu Z., et al., "Scissorhands: Exploiting the Persistence of Importance Hypothesis for LLM KV Cache Compression at Test Time", Advances in Neural Information Processing Systems 36 (2023), arXiv:2305.17118v2, Aug. 28, 2023, 23 Pages.
(Continued)

*Primary Examiner* — Baboucarr Faal
(74) *Attorney, Agent, or Firm* — Patterson & Sheridan LLP

(57) ABSTRACT

Certain aspects of the present disclosure provide techniques and apparatus for machine learning. In an example method, an input prompt comprising a set of tokens is accessed as input to a generative machine learning model. A first key tensor and a first value tensor are generated for a first token of the set of tokens, and the first key tensor and the first value tensor are stored in a memory. A first retention score is generated, for the first token, based on the first key tensor, the first value tensor, and a second token of the set of tokens. The first key tensor and the first value tensor are evicted from the memory in response to determining that the first retention score is a lowest retention score of the memory.

18 Claims, 8 Drawing Sheets

700 ⸺

Access an input prompt comprising a set of tokens as input to a generative machine learning model — 705

Generate, for a first token of the set of tokens, a first key tensor and a first value tensor — 710

Store the first key tensor and the first value tensor in a memory — 715

Generate, for the first token, a first retention score based on the first key tensor, the first value tensor, and a second token of the set of tokens — 720

Evict the first key tensor and the first value tensor from the memory in response to determining that the first retention score is a lowest retention score of the memory — 725

(56)                    References Cited

U.S. PATENT DOCUMENTS

2024/0272088 A1*  8/2024  Calabretta .......... G01N 21/9501
2025/0190394 A1*  6/2025  Jeong ................. G06F 16/2282

OTHER PUBLICATIONS

Oren M., et al., "Transformers are Multi-State RNNs", arXiv:2401.
06104v2 [cs.CL], Jun. 18, 2024, 18 Pages.
Zhang Z., et al., "H2O: Heavy-Hitter Oracle for Efficient Generative
Inference of Large Language Models", 37th Conference on Neural
Information Processing Systems (NeurIPS 2023), arXiv:2306.
14048v3 [cs. LG], Dec. 18, 2023, 49 Pages.
Guo Z., et al., "Attention Score is not All You Need for Token
Importance Indicator in KV Cache Reduction: Value Also Matters",
arXiv:2406.12335v1, Cornell University Library, 201 Olin Library
Cornell University Ithaca, NY 14853, Jun. 18, 2024, pp. 1-7,
XP091792150, the whole document.
International Search Report and Written Opinion—PCT/US2025/
027969—ISA/EPO—Sep. 17, 2025.

* cited by examiner

100

110

Machine Learning System

120
Scoring Component

125
Cache Component

130
Generation Component

105
Input Prompt

115
Output

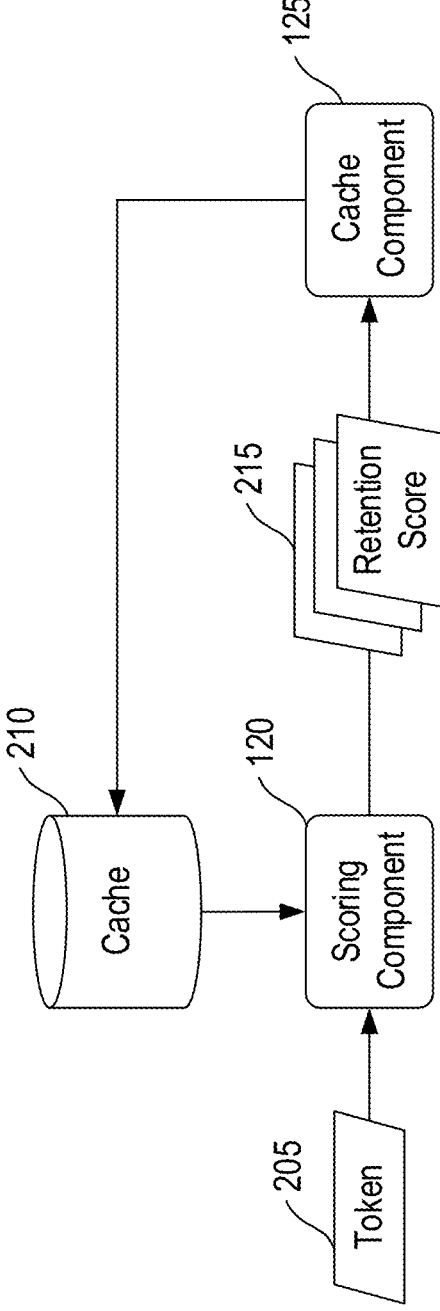
*FIG. 2*

600

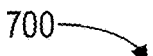

700

```
┌─────────────────────────────────────────────────────────┐
│  Access an input prompt comprising a set of tokens as    │  ╱ 705
│  input to a generative machine learning model            │
└─────────────────────────────────────────────────────────┘
                          │
                          ▼
┌─────────────────────────────────────────────────────────┐
│  Generate, for a first token of the set of tokens, a     │  ╱ 710
│  first key tensor and a first value tensor               │
└─────────────────────────────────────────────────────────┘
                          │
                          ▼
┌─────────────────────────────────────────────────────────┐
│                                                          │  ╱ 715
│  Store the first key tensor and the first value tensor   │
│  in a memory                                             │
└─────────────────────────────────────────────────────────┘
                          │
                          ▼
┌─────────────────────────────────────────────────────────┐
│  Generate, for the first token, a first retention score  │  ╱ 720
│  based on the first key tensor, the first value tensor,  │
│  and a second token of the set of tokens                 │
└─────────────────────────────────────────────────────────┘
                          │
                          ▼
┌─────────────────────────────────────────────────────────┐
│  Evict the first key tensor and the first value tensor   │  ╱ 725
│  from the memory in response to determining that the     │
│  first retention score is a lowest retention score of    │
│  the memory                                              │
└─────────────────────────────────────────────────────────┘
```

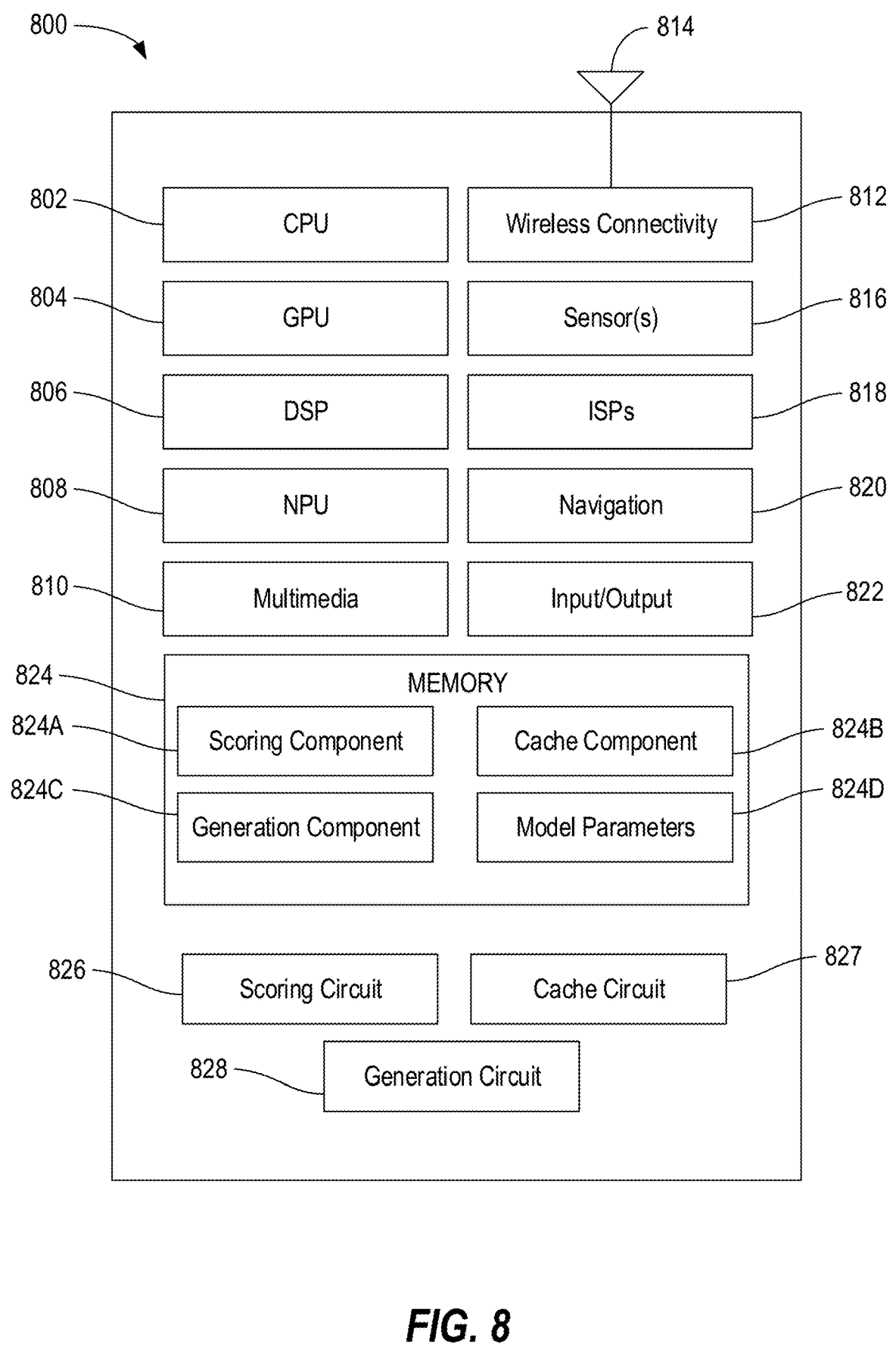

| 802 | CPU | Wireless Connectivity | 812 |
| 804 | GPU | Sensor(s) | 816 |
| 806 | DSP | ISPs | 818 |
| 808 | NPU | Navigation | 820 |
| 810 | Multimedia | Input/Output | 822 |

824 — MEMORY

824A — Scoring Component

824B — Cache Component

824C — Generation Component

824D — Model Parameters

826 — Scoring Circuit

827 — Cache Circuit

828 — Generation Circuit

*FIG. 8*

EFFICIENT MACHINE LEARNING CACHING VIA ATTENTION OUTPUT-BASED TOKEN EVICTION

CROSS-REFERENCE TO RELATED APPLICATION(S)

The present application for patent claims the benefit of priority to U.S. Provisional Appl. No. 63/668,874, filed Jul. 9, 2024, which is hereby incorporated by reference herein in its entirety.

INTRODUCTION

Aspects of the present disclosure relate to machine learning.

A wide variety of machine learning model architectures have been trained to perform an assortment of diverse tasks, including computer vision tasks, language tasks, classification and regression tasks, and the like. Recently, research has yielded substantial success in using large models (e.g., deep neural networks, large language models (LLMs), large vison models (LVMs), large multimodal models (LMMs), and the like) to process and generate output data. Often, machine learning models induce substantial computational expense in inferencing (e.g., generating model output). This expense is particularly problematic on resource-constrained devices (e.g., smartphones). Some attempts to mitigate the computational expense include caching intermediate values during inferencing for subsequent use. However, given the architectures of modern models, such caches rapidly become unacceptably large and often exceed available memory space.

BRIEF SUMMARY

Certain aspects of the present disclosure provide a processor-implemented method, comprising: accessing an input prompt comprising a set of tokens as input to a generative machine learning model; generating, for a first token of the set of tokens, a first key tensor and a first value tensor; storing the first key tensor and the first value tensor in a memory; generating, for the first token, a first retention score based on the first key tensor, the first value tensor, and a second token of the set of tokens; and evicting the first key tensor and the first value tensor from the memory in response to determining that the first retention score is a lowest retention score of the memory.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict example features of certain aspects of the present disclosure and are therefore not to be considered limiting of the scope of this disclosure.

FIG. 2 depicts an example workflow for efficient token eviction during prompt ingestion in machine learning models, according to some aspects of the present disclosure.

FIG. 7 is a flow diagram depicting an example method for data eviction, according to some aspects of the present disclosure.

FIG. 8 depicts an example processing system configured to perform various aspects of the present disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
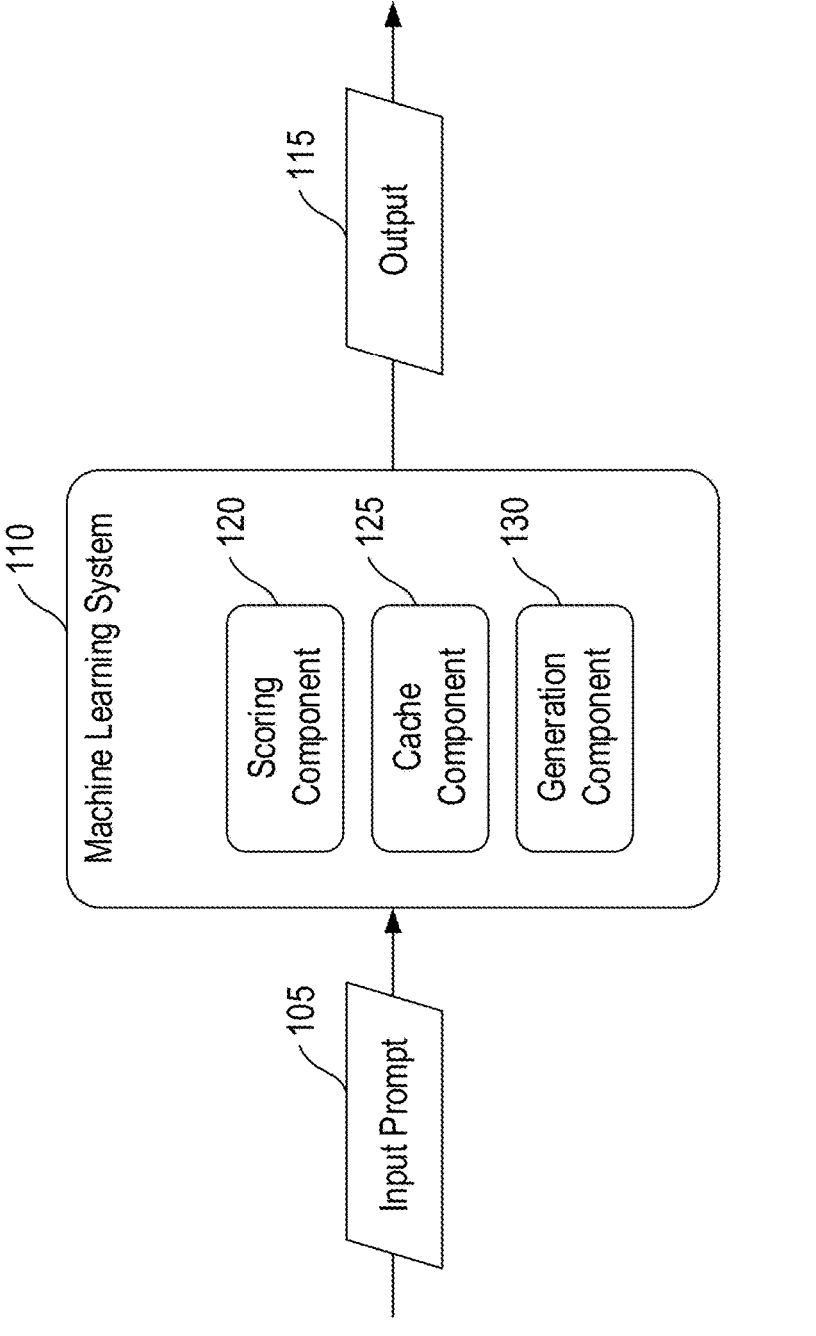
FIG. 1 depicts an example workflow for cache management in machine learning models, according to some aspects of the present disclosure.

Aspects of the present disclosure provide apparatuses, methods, processing systems, and non-transitory computer-readable mediums for providing improved machine learning. Specifically, in some aspects of the present disclosure, techniques for effective cache management in machine learning models are provided.

In a wide variety of machine learning model architectures, attention (e.g., self-attention) is used to generate model output. For example, many models (such as LLMs, LVMs, and the like) use transformer-based self-attention operations. Generating attention scores during data processing generally includes generating a set of intermediate data for each element of the data (e.g., each token). For example, for each token, the model may compute a key tensor (also referred to in some aspects as the "keys"), a value tensor (also referred to in some aspects as the "values"), and a query tensor (also referred to in some aspects as the "queries"). As used herein, a "token" can generally correspond to any logical element of data. For example, in the case of LLMs, the tokens are generally words, phrases, characters, symbols, or portions thereof. In the case of LVMs, the tokens are often pixels (e.g., in an image).

Attention is generally computed for each token with respect to one or more other tokens based on the respective intermediate tensors for each token. Therefore, in some aspects, intermediate data caching can be used to reduce computational expense of the model (e.g., to cache intermediate data that will be used to process subsequent data). For example, in some models, the keys and values of one or more tokens may be cached (referred to in some aspects as "key-value caching" or "KV caching") for reuse in generating attention data for subsequent tokens. As used herein, a "cache" may generally refer to any memory used to store the intermediate data during processing. Similarly, "caching" data may refer to storing the data in any such memory. Further, "evicting" data from a cache may refer to removing or deleting the data from the cache, marking the corresponding memory address space as unused, overwriting the data in the cache, and the like.

While key-value caches can significantly reduce the computational expense of generating model output, these caches grow rapidly and often become a severe memory bottleneck, particularly for devices with limited memory and/or when performing long-context generation (e.g., generating output based on a relatively large input prompt). For example, the memory consumed by the KV cache can exceed the footprint of the model itself (even for large models having millions or billions of parameters).

Some approaches to mitigate these concerns include selective caching (e.g., where a subset of the intermediate data, such as data for a subset of the tokens, is cached, and/or where a subset of the intermediate data is evicted or removed from the cache during processing). In some aspects, removing the intermediate data associated with a given token may be referred to as "evicting" the token or as "token eviction." For example, if the key tensor and value tensor of a given token are removed from the cache, it may be said that the given token was evicted from the cache.

Some approaches to token eviction evaluate attention scores (or some variant thereof) of the tokens to decide which key-value pair(s) to remove from the memory. For example, tokens having low attention scores may be evicted. However, the token attention score is defined based on the keys and queries of the tokens, and such eviction decisions in some conventional systems ignore the effect of the values (which are also being cached). That is, some existing approaches decide whether to evict the keys and the values of a given token based largely or entirely on the keys of the token, without consideration of the values for the token. For example, when a new token is processed, the system may compute an attention score for each prior token based on multiplying the queries of the new token with the keys of the prior token(s) (stored in the cache). The token having the lowest attention score is then evicted.

In some aspects of the present disclosure, token eviction from the cache may be performed based on the change in attention output (which is defined based at least in part on the values of the prior tokens) for the prior tokens, rather than based solely on the attention score (where the attention output is generated based on the attention score between the prior token and the new token, as well as the values of the prior token). In some aspects, a "retention score" can be generated for each token in the cache, where the retention score corresponds to or is defined based on the change in attention output if the token is evicted from the cache.

For example, when a new token is evaluated or input, the change in attention output $y_i$ for the i-th token may be defined using Equation 1 below, where $a_i$ is the attention score for between the i-th token and the new token (e.g., defined as $$q_n^T k_i,$$

where $$q_n^T$$

is the transposed query tensor for the new token and $k_i$ is the key tensor of the i-th token), $V_i$ is the value tensor for the i-th token, and O is the attention output after adding the new token (e.g., the j-th token) and prior to evicting the i-th token (e.g., the attention output if no tokens are evicted). For example, O may be defineu as $$O = \sum_{j=1}^{i} a_{ij} V_j,$$

where $a_{i,j}$ is the attention score between token i and token j, and $V_j$ is the value tensor for the token j. That is, the attention output may be defined as a linear combination of attention score and value vectors with respect to the latest/newest token. This attention output changes each time a new token is generated or ingested.

$$y_i = \frac{a_i}{1 - a_i}(V_i - O) \qquad (1)$$

That is, given a new token (e.g., a new set of queries), the change in attention output is computed for all prior tokens in the cache, and the token having the smallest change may be evicted. In some aspects, for example, the retention score $r_i$ of the i-th token may be defined as a scalar, such as the norm (e.g., the L2 norm) of the change in attention output when the i-th token is evicted (e.g., where $r_i = |y_i|_2$).

Advantageously, by formulating the retention score of each prior token based on both the key tensor and the value tensor of the prior token (both of which are stored in the cache), the computing system can make more effective eviction decisions for the cache. For example, aspects of the present disclosure may result in improved performance or model accuracy by using retention-score-based eviction, as compared to some conventional methods.

Example Workflow for Cache Management in Machine Learning Models

FIG. 1 depicts an example workflow 100 for cache management in machine learning models, according to some aspects of the present disclosure.

In the depicted workflow 100, a machine learning system 110 accesses an input prompt 105 to generate an output 115. As used herein, "accessing" data may generally include receiving, requesting, retrieving, obtaining, generating, collecting, to otherwise gaining access to the data. Although depicted as a discrete computing system for conceptual clarity, in some aspects, the operations of the machine learning system 110 may be implemented using hardware, software, or a combination of hardware and software, and may be distributed across any number and variety of systems.

In some aspects, the input prompt 105 generally comprises an ordered sequence of elements (referred to as "tokens" in some aspects). The particular contents and format of the input prompt 105 may vary depending on the particular implementation. For example, if the machine learning system 110 comprises an LLM, the input prompt 105 may include natural language text (e.g., where each element or token corresponds to a character, word (or portion thereof), or phrase). Similarly, the particular content and format of the output 115 may vary depending on the particular implementation. For example, the output 115 may include a natural language textual string, an image, and the like.

In some aspects, the machine learning system 110 may comprise or implement one or more machine learning models (e.g., generative machine learning models such as diffusion models, LLMs, LVMs, LMMs, and the like). In some aspects, as part of the machine learning model operations, the machine learning system 110 may perform one or more attention operations (e.g., using transformers) to process the input data. As discussed above, attention operations (such as self-attention operations) generally use learned weight tensors to project input features (e.g., the elements of the input prompt 105 or features generated therefrom) to a set of intermediate data (e.g., query (Q), key (K), and value (V) matrices). These intermediate data tensors can then be combined or evaluated to generate an attention score for each respective token (e.g., for each element of the input prompt 105) based on the data contained in the respective token as well as the data contained in one or more other tokens in the input prompt 105.

In some aspects, each token in the input prompt 105 (or features generated therefrom) attends to each other token using the attention mechanism. However, as discussed above, performing this attention introduces substantial computational overhead (e.g., quadratic compute time and high memory usage). Further, as discussed above, some attempts have been made to mitigate or reduce the computational expense by introducing caching of some or all of the intermediate attention data. However, such caches can grow to unrealistic sizes quickly (especially in long-context generation). In the illustrated workflow 100, therefore, the machine learning system 110 can perform selective cache eviction by evicting data associated with token(s) having a low impact on the attention output (e.g., based on retention scores).

Specifically, in the illustrated example, the machine learning system 110 includes a scoring component 120, a cache component 125, and a generation component 130. Although not included in the illustrated example, in some aspects, the machine learning system 110 may include other components, such as to train machine learning models (e.g., to learn the values for the matrices used to generate the queries, keys, and values, among other parameters). Although depicted as discrete components for conceptual clarity, in some aspects, the operations of the depicted components (and others not illustrated) may be combined or distributed across any number of components.

In the illustrated workflow 100, the scoring component 120 may be used to generate retention scores for tokens, as discussed above and in more detail below. For example, for each new token (e.g., for each token in the input prompt 105 and/or for each output token generated by the machine learning system 110), the scoring component 120 may generate an updated retention score for each token having data stored in the cache. In some aspects, as discussed above, the scoring component 120 may generate the retention score for a given token in the cache based on the change in the attention output of the given token before and after the new token is added, as discussed above.

The cache component 125 may generally be used to maintain the cache while processing data using the machine learning model. For example, in some aspects, the cache component 125 may store intermediate data (e.g., key tensors and value tensors) for tokens as the keys and values are generated (e.g., as new tokens are processed). In some aspects, for each new token, the cache component 125 may evaluate the retention scores of each token remaining in the cache (generated by the scoring component 120), and may evict one or more tokens to maintain the size of the cache. For example, for each new token, the cache component 125 may evict the token having the lowest retention score (to make room to store the keys and values of the new token).

The generation component 130 may generally be used to generate new tokens for the output 115 of the machine learning system 110. For example, if the machine learning system 110 corresponds to or uses an LLM, the generation component 130 may generate the output tokens (e.g., words, phrases, characters, and the like) conditioned on the input prompt 105. In some aspects, each time a new token in the output 115 is generated, the scoring component 120 may similarly generate new retention scores and the cache component 125 may update the cache accordingly.

Specifically, in some aspects, the workflow 100 may begin with consumption or ingestion of the input prompt 105. In some aspects, the machine learning system 110 may ingest the input prompt 105 sequentially (e.g., one token at a time, in the order given in the input prompt 105). For example, suppose the prompt is N tokens long, the memory budget (e.g., the maximum size of the cache) is W tokens, and the maximum size of the output 115 is M tokens. In some aspects, the machine learning system 110 may first iterate over the first W tokens of the input prompt 105, caching the intermediate data (e.g., keys and values) for each token.

After W tokens (e.g., when the cache is full), the machine learning system 110 may iterate over the remaining (N-W) tokens in the input prompt 105. For each new token in this remaining set, the scoring component 120 may compute, for each respective token remaining in the cache, a respective updated retention score based on the queries of the new token and the keys and values of the respective cached token. The cache component 125 may then evict the token in the cache having the lowest retention score, and add the intermediate data (e.g., the keys and values) of the new token to the cache. This ingestion process can be repeated for all tokens in the input prompt 105. After ingesting the prompt, the cache contains data for W tokens (e.g., a subset of the N tokens in the prompt).

After ingesting the input prompt 105, the machine learning system 110 may generate the output 115 conditioned on the W tokens in the cache using the forward function of the machine learning model (e.g., the LLM). Specifically, the generation component 130 may generate a new token using an LLM based in part on the intermediate data stored in the cache. The scoring component 120 may then generate, for each respective token in the cache, a respective updated retention score based on the queries of the newly generated token and the keys and values of the respective cached token. The cache component 125 can then evict the token in the cache having the lowest retention score, and add the intermediate data (e.g., the keys and values) of the newly generated token to the cache.

This generation process can be repeated until the generation component 130 generates an end-of-output token, until M tokens have been generated, or until some other termination criteria are met. The output 115 (comprising a sequence of generated tokens) can then be output by the machine learning system 110 (e.g., returned to the entity or application that provided the input prompt 105, output via a display or speaker, and the like). In this way, the machine learning system 110 can efficiently manage relatively small cache sizes with intelligent eviction decisions based on retention scores of the cached tokens.

In some aspects, in addition to ingesting the input prompt 105 itself, the machine learning system 110 may consider multiple input prompts (e.g., one or more prior prompts) to generate the output 115 for the current input prompt 105. For example, for a set of P prompts (including the current input prompt 105 and (P−1) prior input prompts), the scoring component 120 may ingest P new tokens (one from each of the P prompts) sequentially or in parallel to generate, for each respective token in the cache, P new retention scores (one with respect to each of the P new tokens). The cache component 125 may then evaluate this set of P retention scores for each of the W tokens to select which token should be evicted. For example, the cache component 125 may evict the token having the lowest average retention score (of the P scores for the token), the lowest weighted average score (e.g., where relatively older prompts receive relatively lower weights as compared to relatively more recent prompts), and the like. After the input prompt 105 and/or one or more prior prompts are ingested, the generation process may then be performed as discussed above.

Advantageously, the generation and use of key-based and value-based retention scores discussed herein may significantly improve performance of the machine learning system 110. In some aspects, the retention-score-based eviction can be implemented using existing generative artificial intelligence (AI) pipelines without relying on hardware modifications. Further, the disclosed techniques can be implemented as an online (e.g., runtime) algorithm that has a small effect on model generation latency. Additionally, as discussed above, aspects of the present disclosure enable improved performance (e.g., increased accuracy and/or reduced computational expense) for downstream tasks, particularly in limited-budget paradigms.

Generally, using the retention scores discussed above, tokens having smaller attention scores may be likely to be evicted from the cache (in a similar manner to existing approaches). However, the techniques discussed herein may further cause tokens having a small difference between the actual attention output and the value vector to be evicted as well, as the contribution of these tokens to the attention output may be small or unimportant. This can result in substantially improved model output.

Moreover, certain aspects of the present disclosure can enable efficient management of the cache that allows for smaller memory footprint of the cache, allowing machine learning models (e.g., LLMs) to be deployed on devices having smaller memory capacity. Additionally or alternatively, the more intelligent cache evictions can enable accurate longer-context generation (e.g., generating output based on long input prompts 105) using the same or less cache size, as compared to some conventional approaches.

Example Workflow for Efficient Token Eviction During Prompt Ingestion in Machine Learning Models FIG. 2 depicts an example workflow 200 for efficient token eviction during prompt ingestion in machine learning models, according to some aspects of the present disclosure. In some aspects, the workflow 200 is performed by a machine learning system, such as the machine learning system 110 of FIG. 1.

In the illustrated workflow 200, a token 205 is accessed by the scoring component 120. The token 205 may be an element from the input prompt to the machine learning model (e.g., the input prompt 105 of FIG. 1) as discussed above. For example, the token 205 may correspond to a character, word, phrase, or portion thereof in natural language text. In some aspects, as discussed above, the machine learning system evaluates or ingests the prompt sequentially. That is, the prompt may comprise a sequence of tokens with a defined order, and the machine learning system may ingest the tokens in the sequential order indicated by the prompt.

As illustrated, the scoring component 120 further accesses a cache 210. The cache 210 generally includes intermediate data for one or more prior tokens. For example, as discussed above, the cache 210 may include the key tensor(s) and value tensor(s) of one or more prior token(s). That is, the cache 210 may include data for token(s) that were earlier in the sequence of tokens, relative to the token 205, in the input prompt. In some aspects, the cache 210 may additionally or alternatively include data for token(s) from other prior prompts (e.g., the previous P prompts). In some aspects, as discussed above, the cache 210 may have a defined maximum size, such that the machine learning system periodically evicts data for token(s) as data for new token(s) is consumed.

As discussed above, the scoring component 120 generates a retention score 215 for each token reflected in the cache 210 based on the newly accessed token 205. For example, for a given token having intermediate data in the cache 210, the scoring component 120 may generate a retention score 215 indicating the amount that the attention output of the given token changes when the new token 205 is added to the attention mechanism. In some aspects, as discussed above, the scoring component 120 may use Equation 1 to quantify the change, and may then generate the retention score 215 of each token in the cache based on this change (e.g., by computing the L2 norm of the change). In some aspects, each time a new token 205 is ingested, the retention score 215 of each token having data stored in the cache 210 is updated.

As illustrated, the retention scores 215 are accessed by the cache component 125, which evaluates the retention scores 215 to determine whether to evict any data from the cache 210. For example, as discussed above, the cache component 125 may identify the token having the lowest updated retention score 215, and may evict the corresponding data for this token from the cache 210 (e.g., removing the intermediate data, such as the key tensor and the value tensor, for the evicted token). In some aspects, this eviction clears room in the cache 210 to add the intermediate data for the newly ingested token 205 (e.g., the key tensor and the value tensor for the token 205) to the cache 210.

In the illustrated workflow 200, this process is repeated for each next token 205 in the input prompt. In some aspects, once a token is evicted from the cache 210, the machine learning system may refrain from further analyzing or processing the evicted token. That is, subsequent operations (e.g., attention operations or other machine learning operations) may be performed based on the token(s) that remain in the cache 210, and evicted tokens may be ignored or discarded.

Once the workflow 200 has been performed to ingest all of the tokens in the prompt (or up to a defined maximum number of tokens), the machine learning system can use the cache 210 to generate model output, as discussed in more detail below.

Figure 3:
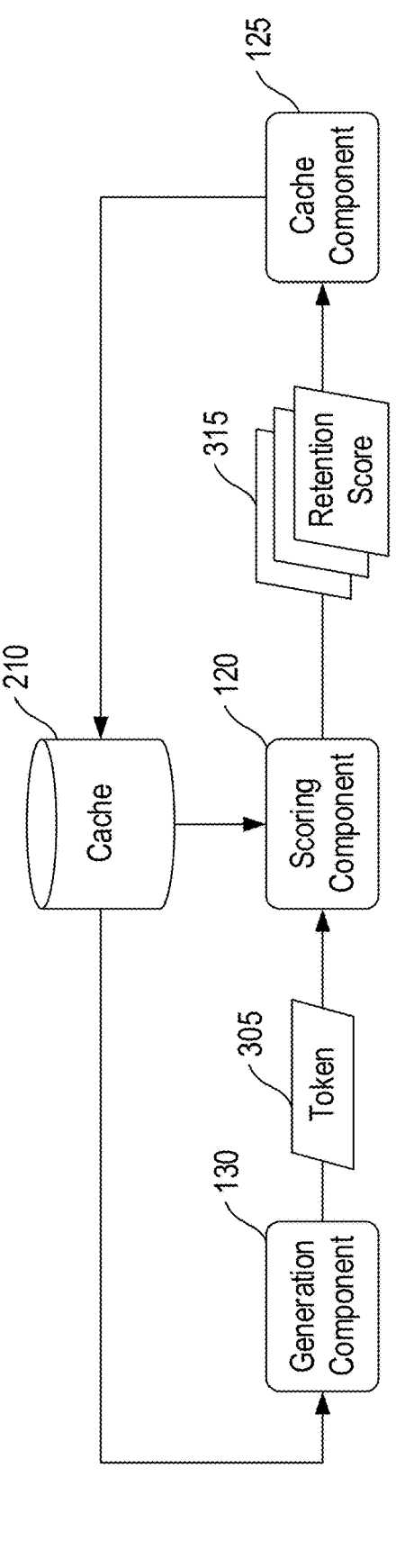
FIG. 3 depicts an example workflow for efficient token eviction during output generation in machine learning models, according to some aspects of the present disclosure.

Example Workflow for Efficient Token Eviction During Output Generation in Machine Learning Models FIG. 3 depicts an example workflow 300 for efficient token eviction during output generation in machine learning models, according to some aspects of the present disclosure. In some aspects, the workflow 300 is performed by a machine learning system, such as the machine learning system 110 of FIG. 1 and/or the machine learning system discussed above with reference to FIG. 2.

The illustrated workflow 300 is similar in some ways to the workflow 200 of FIG. 2. In the illustrated workflow 300, the generation component 130 generates a new a token 305 (referred to in some aspects as an "output token") based on the cache 210. That is, the machine learning system may use the data in the cache 210 (e.g., the keys and values for the tokens from the prompt that were retained during ingestion) to condition the generation of the token 305 using the machine learning model (e.g., the LLM). In some aspects, as discussed above, the cache 210 may additionally or alternatively include data for one or more prior prompts to condition the token generation. Generally, the machine learning system may use any suitable operations or techniques to generate the token 305 based on the cache 210 (e.g., using standard LLM data generation architectures).

In the illustrated example, the newly generated token 305 is accessed by the scoring component 120. As illustrated, the scoring component 120 further accesses the cache 210. As discussed above, the scoring component 120 generates a new retention score 315 for each token reflected in the cache 210 based on the newly generated token 305. For example, for a given token having intermediate data in the cache 210, the scoring component 120 may generate a retention score 315 indicating the amount that the attention output of the given token changes when the new token 305 is generated and added to the attention mechanism. In some aspects, as discussed above, the scoring component 120 may use Equation 1 to quantify the change, and may then generate the retention score 315 of each token in the cache based on this change (e.g., by computing the L2 norm of the change). In some aspects, each time a new token 305 is generated, the retention score 315 of each token having data stored in the cache 210 is updated.

As illustrated, the retention scores 315 are accessed by the cache component 125, which evaluates the retention scores 315 to determine whether to evict any data from the cache 210. For example, as discussed above, the cache component 125 may identify the token having the lowest updated retention score 315, and may evict the corresponding data for this token from the cache 210 (e.g., removing the intermediate data, such as the key tensor and the value tensor, for the evicted token). In some aspects, this eviction clears room in the cache 210 to add the intermediate data for the newly generated token 305 (e.g., the key tensor and the value tensor for the token 305) to the cache 210.

In the illustrated workflow 300, this process is repeated for each token 305 generated by the generation component 130. In some aspects, once a token is evicted from the cache 210, the machine learning system may refrain from further analyzing or processing the evicted token when generating the output tokens 305. That is, subsequent operations (e.g., attention operations or other machine learning operations) may be performed based on the token(s) that remain in the cache 210, and evicted tokens may be ignored or discarded. In some aspects, as discussed above, the next token 305 can then be generated with conditioning from the cache 210 (which may include data for one or more tokens in the prompt and/or prior prompt(s), as well as one or more prior token(s) from the generated output of the model).

As discussed above, if the generated token 305 is an end-of-sentence token (or other token indicating the end of the generated output), the workflow 300 can terminate and the output (e.g., the generated sequence of tokens) can be provided as output of the model. As another example, in some aspects, if the number of generated tokens 305 meets defined criteria (e.g., a defined maximum number of output tokens for the model), the workflow 300 can similarly terminate.

Example Process for Score-Based Token Eviction in Machine Learning Models

Figure 4:
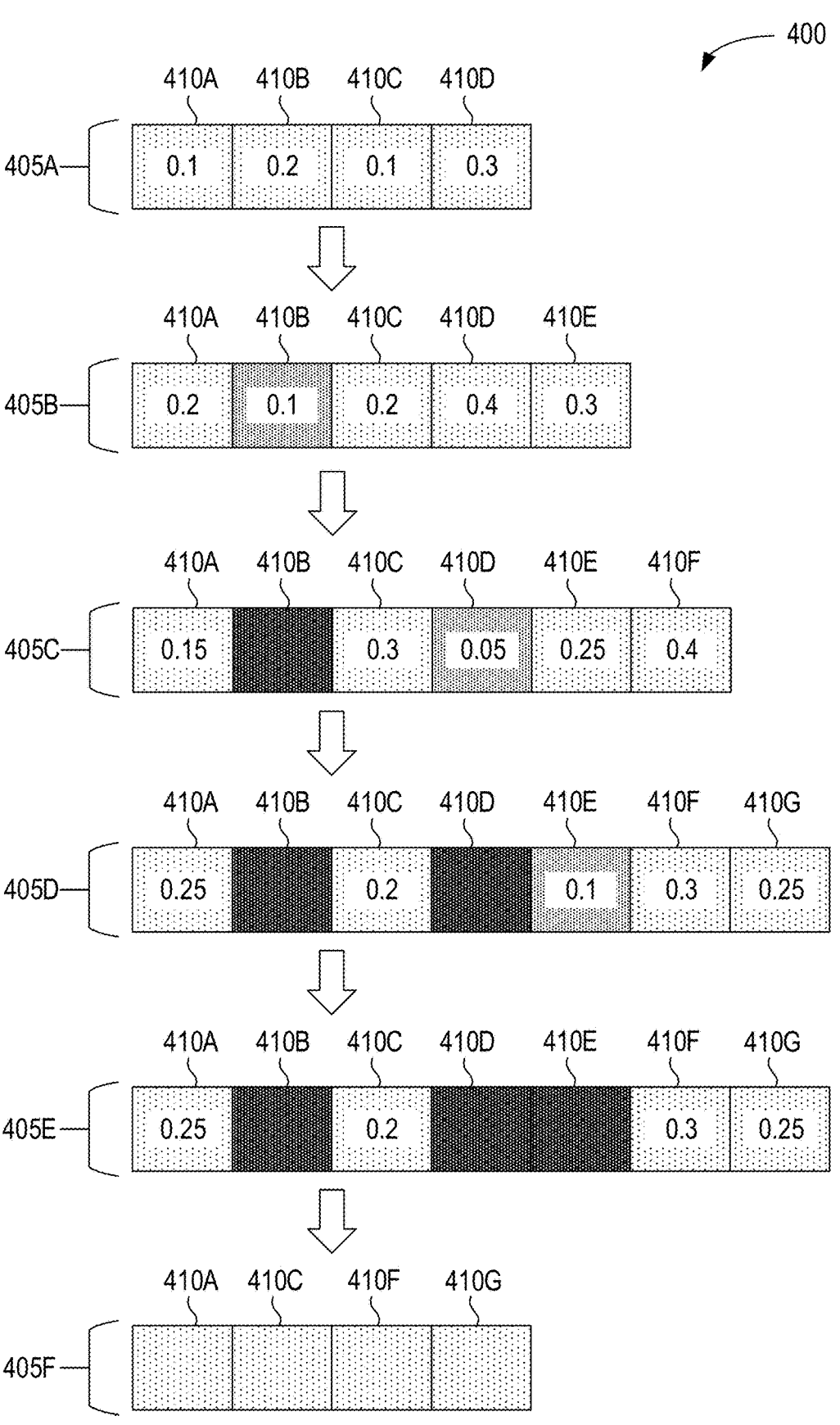
FIG. 4 depicts an example process for score-based token eviction in machine learning models, according to some aspects of the present disclosure.

FIG. 4 depicts an example process 400 for score-based token eviction in machine learning models, according to some aspects of the present disclosure. In some aspects, the process 400 is performed by a machine learning system, such as the machine learning system 110 of FIG. 1 and/or the machine learning system discussed above with reference to FIGS. 2-3.

The illustrated process 400 depicts the content of a machine learning model cache (e.g., the cache 210 of FIGS. 2-3) while processing data using the model (e.g., while ingesting the prompt and/or while generating output tokens). Specifically, the illustrated process 400 depicts the contents of the cache at a sequence of steps 405A-F, where each step corresponds to the addition of a new token in the model (e.g., the ingestion of the next token in the input or the generation of the next token in the output).

As illustrated, at the step 405A, the cache includes four tokens 410A-D (that is, the cache includes data corresponding to four tokens, such as the keys and values of the four tokens). Further, in the illustrated example, each token 410A-D in the cache has a corresponding retention score (e.g., the retention scores 215 of FIG. 2 and/or the retention scores 315 of FIG. 3) based on the most recently added token (e.g., the token 410D). Specifically, at the step 405A, the tensor 410A has a retention score of 0.1, the token 410B has a retention score of 0.2, the token 410C has a retention score of 0.1, and the token 410D has a retention score of 0.3.

As illustrated in the process 400, at the next step 405B, a new token 410E is added (e.g., ingested from the prompt or generated as output of the model). Based on this new token, the retention score of each token 410 in the cache is updated (e.g., using Equation 1 above). Specifically, at the step 405B, the tensor 410A has a new retention score of 0.2, the token 410B has a new retention score of 0.1, the token 410C has a new retention score of 0.2, the token 410D has a new retention score of 0.4, and the new token 410E has a retention score of 0.3.

Further, as illustrated by the more dense stippling at the step 405B, the machine learning system has identified the token 410B as having the lowest retention score, and has decided to evict the token 410B (e.g., to make room in the cache for the data associated with the new token 410E).

At step 405C, as indicated by densest stippling, the token 410B has been evicted. Therefore, as illustrated, the machine learning system does not generate an updated retention score for the token 410B, and the retention scores and/or other information associated with the remaining tokens 410 in the cache are not affected by the token 410B. Although the illustrated example depicts the token 410B remaining at step 405C for conceptual clarity, in some aspects of the present disclosure, evicting the token 410B may include removing or overwriting the associated data in the cache and discarding the token 410B for purposes of the machine learning model. That is, the token 410B may be retained for future use (e.g., if multiple prompts are used to generate retention scores for future inputs and/or if the token 410B is a generated token that is part of the output), but is not used for further processing of the current prompt.

Further, as illustrated at the step 405C, a new token 410F is ingested or processed. Based on the new token 410F, the retention scores of the tokens 410A, 410C, 410D, and 410E remaining in the cache are updated (e.g., using Equation 1 above). Specifically, at the step 405C, the tensor 410A has a new retention score of 0.15, the token 410C has a new retention score of 0.3, the token 410D has a new retention score of 0.05, the token 410E has a new retention score of 0.25, and the new token 410F has a retention score of 0.4. Additionally, as illustrated by the more dense stippling, the machine learning system has determined that the token 410D should be evicted, as the token 410D has the lowest updated retention score.

At step 405D, as indicated by densest stippling, the token 410D has therefore been evicted. The token 410B remains evicted as well. Therefore, as illustrated, the machine learning system does not generate an updated retention score for the token 410D, and the retention scores and/or other information associated with the remaining tokens 410 in the cache are not affected by the token 410D or the token 410B.

Further, as illustrated at the step 405D, another new token 410G is ingested or processed. Based on the new token 410G, the retention scores of the tokens 410A, 410C, 410E, and 410F remaining in the cache are updated (e.g., using Equation 1 above). Specifically, at the step 405D, the tensor 410A has a new retention score of 0.25, the token 410C has a new retention score of 0.2, the token 410E has a new retention score of 0.1, the token 410F has a new retention score of 0.3, and the new token 410G has a retention score of 0.25. Additionally, as illustrated by the denser stippling, the machine learning system has determined that the token 410E should be evicted, as the token 410E has the lowest updated retention score.

At step 405E, as indicated by densest stippling, the token 410E has therefore been evicted. The tokens 410B and 410D remain evicted as well. Therefore, as illustrated, the machine learning system does not generate an updated retention score for the token 410E, and the retention scores and/or other information associated with the remaining tokens 410 in the cache are not affected by the tokens 410B, 410D, and 410E.

As illustrated at the step 405F, the evicted tokens have been removed to illustrate the cache having four remaining tokens: the tokens 410A, 410C, 410F, and 410G. In this way, the machine learning system can ensure that the cache size remains within the defined memory space, and the most relevant tokens are retained for the generation process. For example, if the token 410G was the last token in the input prompt, the machine learning system may then use the cache (e.g., the tokens 410A, 410C, 410F, and 410G) to condition the generation process (e.g., to generate one or more new tokens as output of the model).

Figure 5:
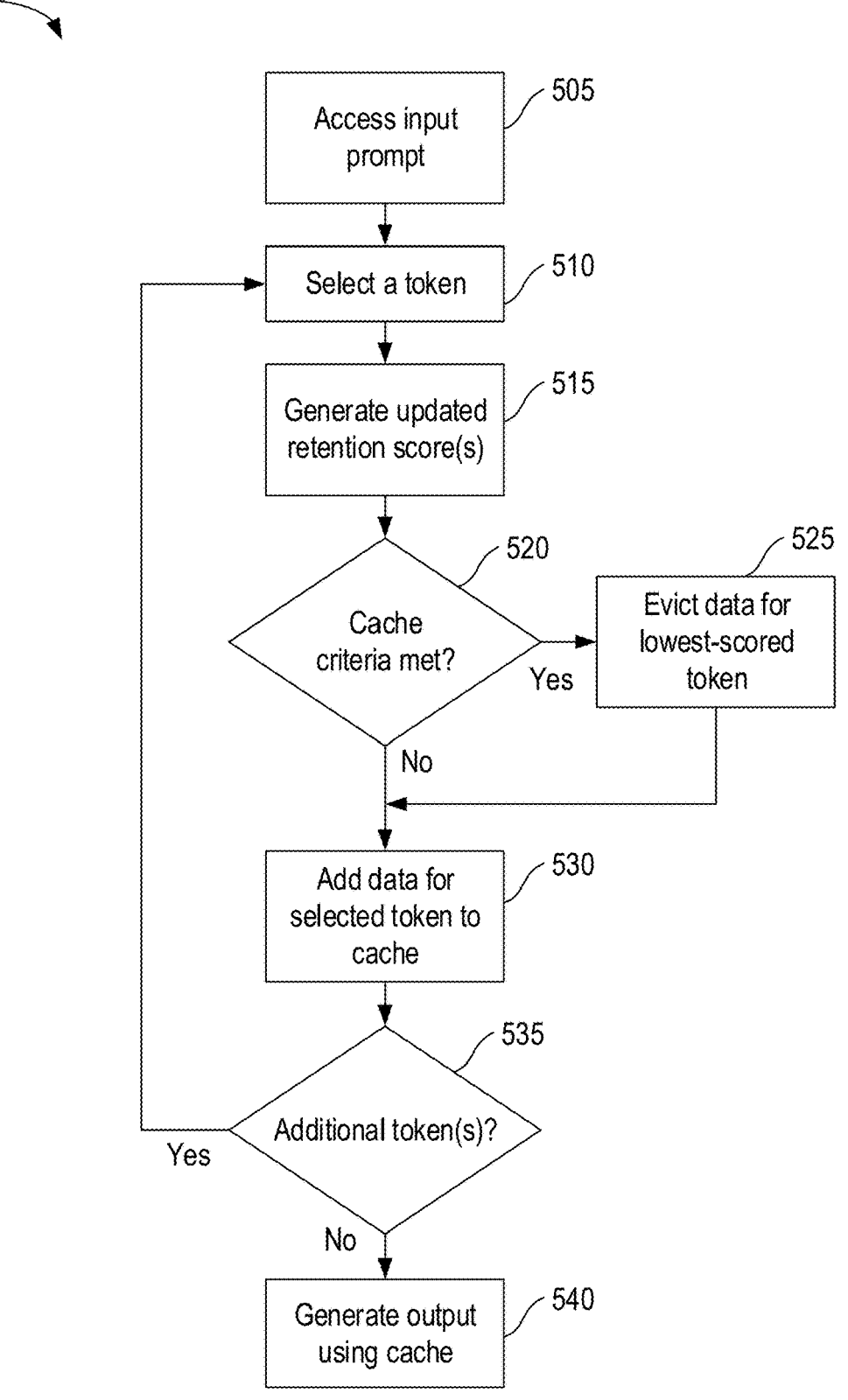
FIG. 5 is a flow diagram depicting an example method for efficient token eviction during prompt ingestion in machine learning models, according to some aspects of the present disclosure.

Example Method for Efficient Token Eviction During Prompt Ingestion in Machine Learning Models FIG. 5 is a flow diagram depicting an example method 500 for efficient token eviction during prompt ingestion in machine learning models, according to some aspects of the present disclosure. In some aspects, the method 500 is performed by a machine learning system, such as the machine learning system 110 of FIG. 1 and/or the machine learning system discussed above with reference to FIGS. 2-4.

At block 505, the machine learning system accesses an input prompt for a machine learning model (e.g., the input prompt 105 of FIG. 1). In some aspects, as discussed above, the input prompt generally comprises a set or sequence of tokens (e.g., characters, words, or phrases of natural language text) used to prompt the model (e.g., an LLM) to generate an output sequence of tokens (e.g., a string of natural language text).

At block 510, the machine learning system selects a token from the input prompt. Generally, the machine learning system may select the token using a variety of techniques. In some aspects, the machine learning system selects the tokens, from the input prompt, sequentially. That is, the machine learning system may ingest the prompt sequentially (e.g., such that each token is processed or evaluated based on the prior token(s) in the prompt).

At block 515, the machine learning system generates updated retention score(s) (e.g., the retention scores 215 of FIG. 2 and/or the retention scores 315 of FIG. 3) for any token(s) currently residing in the cache (e.g., the tokens 410 of FIG. 4), based on the selected token. For example, as discussed above, the machine learning system may use Equation 1 to quantify the contribution of each prior token to the attention output (with respect to the new token). In some aspects, as discussed above, generating the retention scores includes generating intermediate data (e.g., at least a query tensor) for the newly selected token, and using this query tensor to generate the retention score for each respective token in the cache based on a respective key tensor and a respective value tensor of the respective token.

In some aspects, as discussed above, the machine learning system may generate multiple retention scores for each token in the cache (e.g., based on prior prompts in addition to the current prompt).

At block 520, the machine learning system determines whether one or more cache criteria are met. For example, as discussed above, the machine learning system may determine whether the size of the cache meets or exceeds a defined maximum threshold (e.g., a defined number of tokens). If so, the method 500 continues to block 525, where the machine learning system evicts the data, from the cache, that corresponds to the token having the lowest retention score in the cache, as discussed above. The method 500 then continues to block 530.

Returning to block 520, if the machine learning system determines that the criteria are not met (e.g., the cache is not yet full), the method 500 continues to block 530. At block 530, the machine learning system adds (intermediate) data for the newly selected token to the cache. For example, as discussed above, the machine learning system may add the key tensor and the value tensor for the selected token to the cache.

At block 535, the machine learning system determines whether there is at least one additional token remaining in the prompt to be ingested. If so, the method 500 returns to block 510. If not, the method 500 continues to block 540. At block 540, the machine learning system generates an output of the machine learning model using the cache. For example, as discussed above, the machine learning system may use an LLM conditioned based on the token(s) in the cache to generate the model output. One example method for generating the model output is discussed in more detail below with reference to FIG. 6.

Figure 6:
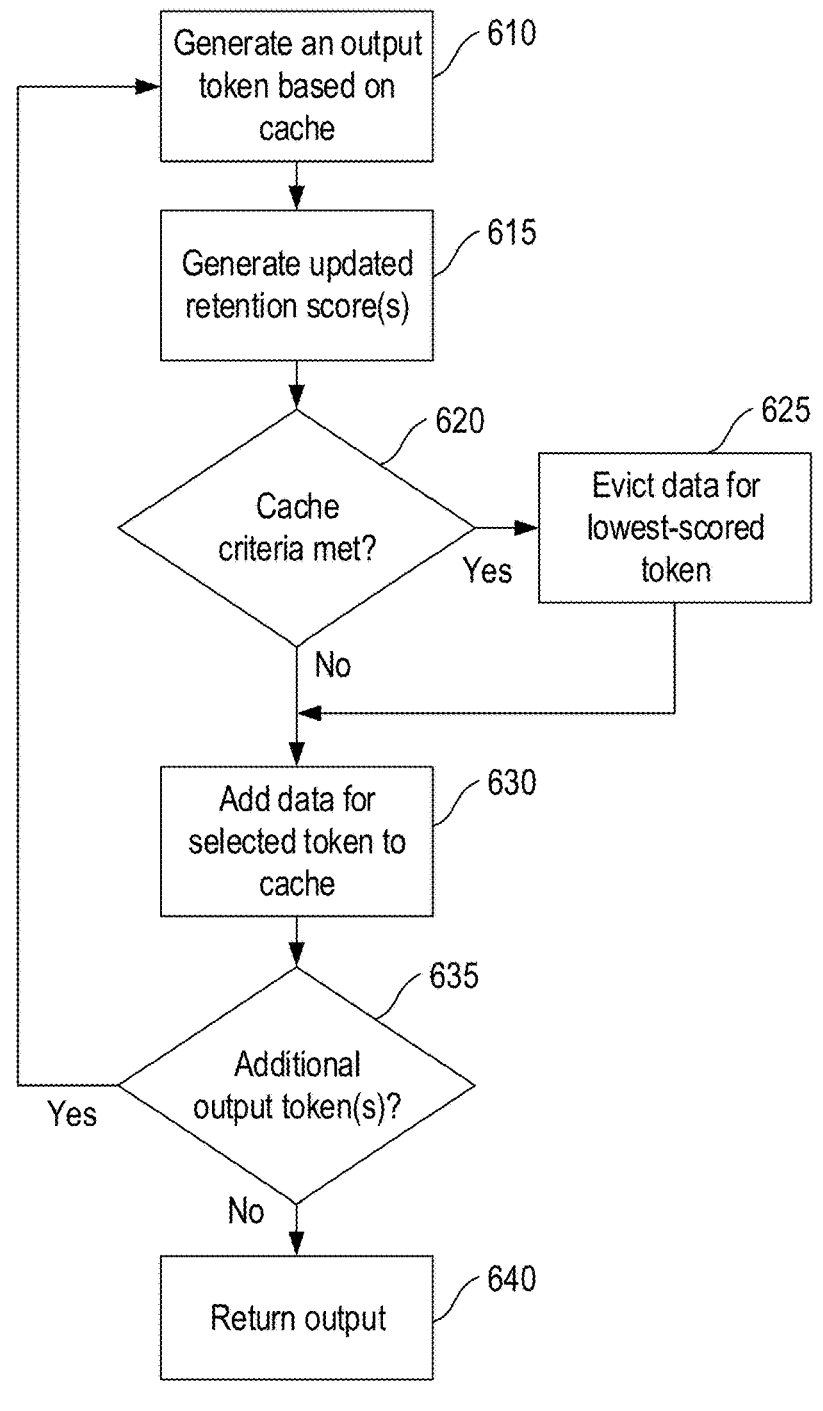
FIG. 6 is a flow diagram depicting an example method for efficient token eviction during output generation in machine learning models, according to some aspects of the present disclosure.

Example Method for Efficient Token Eviction During Output Generation in Machine Learning Models FIG. 6 is a flow diagram depicting an example method 600 for efficient token eviction during output generation in machine learning models, according to some aspects of the present disclosure. In some aspects, the method 600 is performed by a machine learning system, such as the machine learning system 110 of FIG. 1 and/or the machine learning system discussed above with reference to FIGS. 2-5.

At block 610, the machine learning system generates an output token for the model based at least in part on the data contained in the cache. For example, as discussed above, the machine learning system may use an LLM conditioned based on the tokens in the cache to generate the next token in the output.

At block 615, the machine learning system generates updated retention score(s) (e.g., the retention scores 215 of FIG. 2 and/or the retention scores 315 of FIG. 3) for any token(s) currently residing in the cache (e.g., the tokens 410 of FIG. 4), based on the newly generated token. For example, as discussed above, the machine learning system may use Equation 1 to quantify the contribution of each prior token to the attention output (with respect to the new token). In some aspects, as discussed above, generating the retention scores includes generating intermediate data (e.g., at least a query tensor) for the newly generated token, and using this query tensor to generate the retention score for each respective token in the cache based on a respective key tensor and a respective value tensor of the respective token.

At block 620, the machine learning system determines whether one or more cache criteria are met. For example, as discussed above, the machine learning system may determine whether the size of the cache meets or exceeds a defined maximum threshold (e.g., a defined number of tokens). If so, the method 600 continues to block 625, where the machine learning system evicts the data, from the cache, that corresponds to the token having the lowest retention score in the cache, as discussed above. The method 600 then continues to block 630.

Returning to block 620, if the machine learning system determines that the criteria are not met (e.g., the cache is not yet full), the method 600 continues to block 630. At block 630, the machine learning system adds (intermediate) data for the newly generated token to the cache. For example, as discussed above, the machine learning system may add the key tensor and the value tensor for the generated token to the cache.

At block 635, the machine learning system determines whether at least one additional token should be generated. For example, as discussed above, the machine learning system may determine whether the newly generated token (generated at block 615) corresponds to an end-of-output token, whether the number of tokens generated meets or exceeds a defined maximum output length threshold, and the like.

If the machine learning system determines that at least one additional token should be generated, the method 600 returns to block 610. If the machine learning system determines that no additional tokens should be generated, the method 600 continues to block 640. At block 640, the machine learning system outputs the generated output (e.g., the sequence of tokens) as output of the machine learning model. For example, as discussed above, the machine learning system may return the output to the entity (e.g., application) that provided the prompt.

Example Method for Data Eviction in Machine Learning Models

FIG. 7 is a flow diagram depicting an example method 700 for data eviction in machine learning models, according to some aspects of the present disclosure. In some aspects, the method 700 is performed by a machine learning system, such as the machine learning system 110 of FIG. 1 and/or the machine learning system discussed above with reference to FIGS. 2-6.

At block 705, an input prompt comprising a set of tokens is accessed as input to a generative machine learning model.

At block 710, a first key tensor and a first value tensor are generated for a first token of the set of tokens.

At block 715, the first key tensor and the first value tensor are stored in a memory.

At block 720, a first retention score is generated, for the first token, based on the first key tensor, the first value tensor, and a second token of the set of tokens At block 725, the first key tensor and the first value tensor are evicted from the memory in response to determining that the first retention score is a lowest retention score of the memory.

In some aspects, the method 700 further includes storing a second key tensor and a second value tensor corresponding to the second token in the memory.

In some aspects, the method 700 further includes generating, for the second token, a second retention score based on the second key tensor, the second value tensor, and a third token of the set of tokens, determining not to evict the second key tensor and the second value tensor from the memory in response to determining that the second retention score is not the lowest retention score of the memory, and storing a third key tensor and a third value tensor corresponding to the third token in the memory.

In some aspects, the method 700 further includes generating, for a fourth token, a third retention score based on a fourth key tensor, a fourth value tensor, and the third token of the set of tokens and evicting the fourth key tensor and the fourth value tensor from the memory in response to determining that the third retention score is the lowest retention score of the memory.

In some aspects, evicting the first key tensor and the first value tensor is performed in further response to determining that a size of the memory satisfies a maximum memory size.

In some aspects, the method 700 further includes, subsequent to generating a respective key tensor and a respective value tensor for each respective token of the set of tokens, generating a new token using the generative machine learning model and based on at least a subset of the respective key tensors and the respective value tensors.

In some aspects, the method 700 further includes generating, for the second token, a second retention score based on the second key tensor, the second value tensor, and the new token and evicting the second key tensor and the second value tensor from the memory in response to determining that the second retention score is a lowest retention score of the memory.

In some aspects, the method 700 further includes storing a new key tensor and a new value tensor corresponding to the new token in the memory.

In some aspects, the method 700 further includes generating an output of the generative machine learning model including the new token.

In some aspects, the first retention score corresponds to a change in attention output of the generative machine learning model if the first token is evicted from the memory.

In some aspects, the first retention score is defined as $$y_i = \left| \frac{a_i}{(1 - a_i)} (V_i - O) \right|_2,$$

wherein $y_i$ is the first retention score, $a_i$ is an attention score between the first token and the second token, $V_i$ is the first value tensor, and O is the attention output prior to evicting the first token from the memory.

Example Processing System for Machine Learning

FIG. 8 depicts an example processing system 800 configured to perform various aspects of the present disclosure, including, for example, the techniques and methods described with respect to FIGS. 1-7. In some aspects, the processing system 800 may correspond to a machine learning system. For example, the processing system 800 may correspond to the machine learning system 110 of FIG. 1 and/or the machine learning system discussed above with reference to FIGS. 2-7. Although depicted as a single system for conceptual clarity, in some aspects, as discussed above, the components described below with respect to the processing system 800 may be distributed across any number of devices or systems.

The processing system 800 includes a central processing unit (CPU) 802, which in some examples may be a multicore CPU. Instructions executed at the CPU 802 may be loaded, for example, from a program memory associated with the CPU 802 or may be loaded from a memory partition (e.g., a partition of a memory 824).

The processing system 800 also includes additional processing components tailored to specific functions, such as a graphics processing unit (GPU) 804, a digital signal processor (DSP) 806, a neural processing unit (NPU) 808, a multimedia component 810 (e.g., a multimedia processing unit), and a wireless connectivity component 812.

An NPU, such as the NPU 808, is generally a specialized circuit configured for implementing the control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as the NPU 808, are configured to accelerate the performance of common machine learning tasks, such as image classification, machine translation, object detection, and various other predictive models. In some examples, a plurality of NPUs may be instantiated on a single chip, such as a system on a chip (SoC), while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this piece of data through an already trained model to generate a model output (e.g., an inference). In some implementations, the NPU 808 is a part of one or more of the CPU 802, the GPU 804, and/or the DSP 806.

In some examples, the wireless connectivity component 812 may include subcomponents, for example, for third generation (3G) connectivity, fourth generation (4G) connectivity (e.g., Long-Term Evolution (LTE)), fifth generation (5G) connectivity (e.g., New Radio (NR)), Wi-Fi connectivity, Bluetooth connectivity, and other wireless data transmission standards. The wireless connectivity component 812 is further coupled to one or more antennas 814.

The processing system 800 may also include one or more sensor processing units 816 associated with any manner of sensor, one or more image signal processors (ISPs) 818 associated with any manner of image sensor, and/or a navigation processor 820, which may include satellite-based positioning system components (e.g., GPS or GLONASS) as well as inertial positioning system components.

The processing system 800 may also include one or more input and/or output devices 822, such as screens, touch-sensitive surfaces (including touch-sensitive displays), physical buttons, speakers, microphones, and the like.

In some examples, one or more of the processors of the processing system 800 may be based on an ARM or RISC-V instruction set.

The processing system 800 also includes a memory 824, which is representative of one or more static and/or dynamic memories, such as a dynamic random access memory, a flash-based static memory, and the like. In this example, the memory 824 includes computer-executable components, which may be executed by one or more of the aforementioned processors of the processing system 800.

In particular, in this example, the memory 824 includes a scoring component 824A, a cache component 824B, and a generation component 824C. Although not depicted in the illustrated example, the memory 824 may also include other components, such as a training component used to train or update machine learning model(s). Though depicted as discrete components for conceptual clarity in FIG. 8, the illustrated components (and others not depicted) may be collectively or individually implemented in various aspects.

Further, in the illustrated example, the memory 824 also includes model parameters 824D (e.g., parameters of one or more machine learning models, such as an LLM). Although not depicted in the illustrated example, in some aspects, the memory 824 may include other data such as a training data for the machine learning model(s), prior prompt(s) processed by the machine learning model(s), prior outputs generated by the machine learning model(s), and the like.

The processing system 800 further comprises a scoring circuit 826, a cache circuit 827, and a generation circuit 828. The depicted circuits, and others not depicted (such as an inferencing circuit), may be configured to perform various aspects of the techniques described herein.

The scoring component 824A and/or the scoring circuit 826 (which may correspond to the scoring component 120 of FIGS. 1-3) may be used to generate retention scores for tokens stored in a machine learning model cache, as discussed above. For example, the scoring component 824A and/or the scoring circuit 826 may use Equation 1 to generate the retention scores when a new token is ingested (e.g., generated by the model or selected from the input) based on the change in the attention output caused by each respective prior token (based on the newly added token).

The cache component 824B and/or the cache circuit 827 may be used to selectively add and evict tokens from the cache based on retention scores, as discussed above. For example, the cache component 824B and/or the cache circuit 827 may, when the cache is full and data for a new token is ready to be added to the cache, evict the data associated with the token having the lowest retention score, as discussed above.

The generation component 824C and/or the generation circuit 828 may be used to generate machine learning model output (e.g., the output token 305 of FIG. 3), as discussed above. For example, the generation component 824C and/or the generation circuit 828 may condition the model (e.g., an LLM) based on the cache to generate the output tokens sequentially.

Though depicted as separate components and circuits for clarity in FIG. 8, the scoring circuit 826, the cache circuit 827, and the generation circuit 828 may collectively or individually be implemented in other processing devices of the processing system 800, such as within the CPU 802, the GPU 804, the DSP 806, the NPU 808, and the like.

Generally, the processing system 800 and/or components thereof may be configured to perform the methods described herein.

Notably, in other aspects, aspects of the processing system 800 may be omitted, such as where the processing system 800 is a server computer or the like. For example, the multimedia component 810, the wireless connectivity component 812, the sensor processing units 816, the ISPs 818, and/or the navigation processor 820 may be omitted in other aspects. Further, aspects of the processing system 800 may be distributed between multiple devices.

Example Clauses

Implementation examples are described in the following numbered clauses:

Clause 1: A method, comprising: accessing an input prompt comprising a set of tokens as input to a generative machine learning model; generating, for a first token of the set of tokens, a first key tensor and a first value tensor; storing the first key tensor and the first value tensor in a memory; generating, for the first token, a first retention score based on the first key tensor, the first value tensor, and a second token of the set of tokens; and evicting the first key tensor and the first value tensor from the memory in response to determining that the first retention score is a lowest retention score of the memory.

Clause 2: A method according to Clause 1, further comprising storing a second key tensor and a second value tensor corresponding to the second token in the memory.

Clause 3: A method according to Clause 2, further comprising: generating, for the second token, a second retention score based on the second key tensor, the second value tensor, and a third token of the set of tokens; determining not to evict the second key tensor and the second value tensor from the memory in response to determining that the second retention score is not the lowest retention score of the memory; and storing a third key tensor and a third value tensor corresponding to the third token in the memory.

Clause 4: A method according to Clause 3, further comprising: generating, for a fourth token, a third retention score based on a fourth key tensor, a fourth value tensor, and the third token of the set of tokens; and evicting the fourth key tensor and the fourth value tensor from the memory in response to determining that the third retention score is the lowest retention score of the memory.

Clause 5: A method according to any of Clauses 1-4, wherein evicting the first key tensor and the first value tensor is performed in further response to determining that a size of the memory satisfies a maximum memory size.

Clause 6: A method according to any of Clauses 1-5, further comprising, subsequent to generating a respective key tensor and a respective value tensor for each respective token of the set of tokens, generating a new token using the generative machine learning model and based on at least a subset of the respective key tensors and the respective value tensors.

Clause 7: A method according to Clause 6, further comprising: generating, for the second token, a second retention score based on the second key tensor, the second value tensor, and the new token; and evicting the second key tensor and the second value tensor from the memory in response to determining that the second retention score is a lowest retention score of the memory.

Clause 8: A method according to Clause 7, further comprising storing a new key tensor and a new value tensor corresponding to the new token in the memory.

Clause 9: A method according to any of Clauses 6-7, further comprising generating an output of the generative machine learning model including the new token.

Clause 10: A method according to any of Clauses 1-9, wherein the first retention score corresponds to a change in attention output of the generative machine learning model if the first token is evicted from the memory.

Clause 11: A method according to any of Clauses 1-10, wherein the first retention score is defined as $$y_i = \left| \frac{a_i}{(1 - a_i)} (V_i - O) \right|_2,$$

wherein: $y_i$ is the first retention score, $a_i$ is an attention score between the first token and the second token, $V_i$ is the first value tensor, and O is the attention output prior to evicting the first token from the memory.

Clause 12: A processing system comprising: a memory comprising processor-executable instructions; and one or more processors coupled to the one or more memories and configured to execute the processor-executable instructions and cause the processing system to perform a method in accordance with any of Clauses 1-11.

Clause 13: A processing system comprising means for performing a method in accordance with any of Clauses 1-11.

Clause 14: A non-transitory computer-readable medium comprising computer-executable instructions that, when executed by one or more processors of a processing system, cause the processing system to perform a method in accordance with any of Clauses 1-11.

Clause 15: A computer program product embodied on a computer-readable storage medium comprising code for performing a method in accordance with any of Clauses 1-11.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processing system for machine learning comprising:
one or more memories comprising processor-executable instructions; and
one or more processors coupled to the one or more memories and configured to execute the processor-executable instructions and cause the processing system to:
access an input prompt comprising a set of tokens as input to a generative machine learning model;
generate, for a first token of the set of tokens, a first key tensor and a first value tensor;
store the first key tensor and the first value tensor in a memory;
generate, for the first token, a first retention score based on the first key tensor, the first value tensor, and a second token of the set of tokens; and
evict the first key tensor and the first value tensor from the memory in response to determining that the first retention score is a lowest retention score of the memory;
wherein the first retention score corresponds to a change in attention output of the generative machine learning model if the first token is evicted from the memory;
wherein the first retention score is defined as $$r_i = \left| \frac{a_i}{(1-a_i)} (V_i - O) \right|_2,$$

wherein:
$r_i$ is the first retention score,
$a_i$ is an attention score between the first token and the second token,
$V_i$ is the first value tensor, and
$O$ is the attention output prior to evicting the first token from the memory.

2. The processing system of claim 1, wherein the one or more processors are configured to execute the processor-executable instructions and further cause the processing system to store a second key tensor and a second value tensor corresponding to the second token in the memory.

3. The processing system of claim 2, wherein the one or more processors are configured to execute the processor-executable instructions and further cause the processing system to:
generate, for the second token, a second retention score based on the second key tensor, the second value tensor, and a third token of the set of tokens;
determine not to evict the second key tensor and the second value tensor from the memory in response to determining that the second retention score is not the lowest retention score of the memory; and
store a third key tensor and a third value tensor corresponding to the third token in the memory.

4. The processing system of claim 3, wherein the one or more processors are configured to execute the processor-executable instructions and further cause the processing system to:

generate, for a fourth token, a third retention score based on a fourth key tensor, a fourth value tensor, and the third token of the set of tokens; and evict the fourth key tensor and the fourth value tensor from the memory in response to determining that the third retention score is the lowest retention score of the memory.

5. The processing system of claim 1, wherein the one or more processors are configured to execute the processor-executable instructions and further cause the processing system to evict the first key tensor and the first value tensor in further response to determining that a size of the memory satisfies a maximum memory size.

6. The processing system of claim 1, wherein the one or more processors are configured to execute the processor-executable instructions and further cause the processing system to, subsequent to generating a respective key tensor and a respective value tensor for each respective token of the set of tokens, generate a new token using the generative machine learning model and based on at least a subset of the respective key tensors and the respective value tensors.

7. The processing system of claim 6, wherein the one or more processors are configured to execute the processor-executable instructions and further cause the processing system to:

generate, for the second token, a second retention score based on a second key tensor corresponding to the second token, a second value tensor corresponding to the second token, and the new token; and evict the second key tensor and the second value tensor from the memory in response to determining that the second retention score is a lowest retention score of the memory.

8. The processing system of claim 7, wherein the one or more processors are configured to execute the processor-executable instructions and further cause the processing system to store a new key tensor and a new value tensor corresponding to the new token in the memory.

9. The processing system of claim 6, wherein the one or more processors are configured to execute the processor-executable instructions and further cause the processing system to generate an output of the generative machine learning model including the new token.

10. A processor-implemented method for generative machine learning, comprising:

accessing an input prompt comprising a set of tokens as input to a generative machine learning model;

generating, for a first token of the set of tokens, a first key tensor and a first value tensor;

storing the first key tensor and the first value tensor in a memory;

generating, for the first token, a first retention score based on the first key tensor, the first value tensor, and a second token of the set of tokens; and evicting the first key tensor and the first value tensor from the memory in response to determining that the first retention score is a lowest retention score of the memory;

wherein the first retention score corresponds to a change in attention output of the generative machine learning model if the first token is evicted from the memory;

wherein the first retention score is defined as $$r_i = \left| \frac{a_i}{(1 - a_i)} (V_i - O) \right|_2,$$

wherein:

$r_i$ is the first retention score, $a_i$ is an attention score between the first token and the second token, $V_i$ is the first value tensor, and $O$ is the attention output prior to evicting the first token from the memory.

11. The processor-implemented method of claim 10, further comprising:

storing a second key tensor and a second value tensor corresponding to the second token in the memory;

generating, for the second token, a second retention score based on the second key tensor, the second value tensor, and a third token of the set of tokens;

determining not to evict the second key tensor and the second value tensor from the memory in response to determining that the second retention score is not the lowest retention score of the memory; and storing a third key tensor and a third value tensor corresponding to the third token in the memory.

12. The processor-implemented method of claim 11, further comprising:

generating, for a fourth token, a third retention score based on a fourth key tensor, a fourth value tensor, and the third token of the set of tokens; and evicting the fourth key tensor and the fourth value tensor from the memory in response to determining that the third retention score is the lowest retention score of the memory.

13. The processor-implemented method of claim 10, wherein evicting the first key tensor and the first value tensor is performed in further response to determining that a size of the memory satisfies a maximum memory size.

14. The processor-implemented method of claim 10, further comprising, subsequent to generating a respective key tensor and a respective value tensor for each respective token of the set of tokens, generating a new token using the generative machine learning model and based on at least a subset of the respective key tensors and the respective value tensors.

15. The processor-implemented method of claim 14, further comprising:

generating, for the second token, a second retention score based on a second key tensor corresponding to the second token, a second value tensor corresponding to the second token, and the new token; and evicting the second key tensor and the second value tensor from the memory in response to determining that the second retention score is a lowest retention score of the memory.

16. The processor-implemented method of claim 15, further comprising:

storing a new key tensor and a new value tensor corresponding to the new token in the memory; and generating an output of the generative machine learning model including the new token.

17. The processor-implemented method of claim 10, wherein the first retention score corresponds to a change in attention output of the generative machine learning model if the first token is evicted from the memory.

18. A processing system, comprising:

means for accessing an input prompt comprising a set of tokens as input to a generative machine learning model;

means for generating, for a first token of the set of tokens, a key tensor and a value tensor; 5 means for storing the key tensor and the value tensor;

means for generating, for the first token, a retention score based on the key tensor, the value tensor, and a second token of the set of tokens; and means for evicting the key tensor and the value tensor 10 from the means for storing in response to determining that the retention score is a lowest retention score of the means for storing;

wherein the first retention score corresponds to a change in attention output of the generative machine learning 15 model if the first token is evicted from the memory;

wherein the first retention score is defined as $$ r_i = \left| \frac{a_i}{(1 - a_i)} (V_i - O) \right|_2 , $$ 20 wherein $r_i$ is the first retention score, $a_i$ is an attention score between the first token and the 25 second token, $V_i$ is the first value tensor, and $O$ is the attention output prior to evicting the first token from the memory.

30

* * * * *